(12) United States Patent
Silverstein et al.

(10) Patent No.: US 11,520,679 B1
(45) Date of Patent: Dec. 6, 2022

(54) RESOURCE ACCESS BASED ON USER ACCESS RATINGS DURING CONSTRAINED SYSTEM PERFORMANCE

(71) Applicant: International Business Machines Corporation, Armonk, NY (US)

(72) Inventors: Zachary A. Silverstein, Austin, TX (US); Jacob Ryan Jepperson, St. Paul, MN (US); Spencer Thomas Reynolds, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/318,021

(22) Filed: May 12, 2021

(51) Int. Cl.
*G06F 11/34* (2006.01)
*G06F 9/50* (2006.01)

(52) U.S. Cl.
CPC .......... *G06F 11/3438* (2013.01); *G06F 9/505* (2013.01); *G06F 11/3409* (2013.01); *G06F 2209/504* (2013.01); *G06F 2209/508* (2013.01)

(58) Field of Classification Search
CPC ............. G06F 11/3438; G06F 11/3409; G06F 2209/504; G06F 2209/508
See application file for complete search history.

(56) References Cited

U.S. PATENT DOCUMENTS

| | | | | |
|---|---|---|---|---|
| 4,183,083 A * | 1/1980 | Chatfield | .............. | G06F 9/4831 710/260 |
| 6,393,455 B1 * | 5/2002 | Eilert | .................... | G06F 9/5061 718/104 |
| 6,490,645 B1 * | 12/2002 | Shahaf | .............. | H04W 74/0875 710/240 |
| 6,732,138 B1 * | 5/2004 | Browning | ............... | G06F 9/468 718/107 |
| 6,832,255 B1 * | 12/2004 | Rumsewicz | ........ | H04L 67/1029 709/227 |
| 7,933,249 B2 * | 4/2011 | Amalfitano | ........... | H04W 28/24 370/335 |
| 8,375,244 B2 | 2/2013 | Bobak | | |

(Continued)

FOREIGN PATENT DOCUMENTS

| | | |
|---|---|---|
| CN | 103763784 B | 4/2014 |
| CN | 105873173 B | 8/2016 |
| JP | 2013206179 A | 10/2013 |

OTHER PUBLICATIONS

"DRaaS hybrid platform recovery", Downloaded Apr. 14, 2021, 8 pages, <https://www.ibm.com/services/business-continuity/draas>.

(Continued)

*Primary Examiner* — Benjamin C Wu
(74) *Attorney, Agent, or Firm* — Christopher M. Pignato; Brian M. Restauro

(57) ABSTRACT

An overall access rating for each user in a plurality of users for accessing a computing resource of a set of computing resources is generated. Reduced performance of the computing resource is identified. Access metrics associated with each user in the plurality of users who are accessing the computing resource during the reduced performance of the computing resource are determined. The generated overall access ratings based on the determined access metrics are modified. Access to the computing resource is granted based on a ranking of the modified overall access ratings.

17 Claims, 4 Drawing Sheets

(56) References Cited

U.S. PATENT DOCUMENTS

| | | | |
|---|---|---|---|
| 8,826,077 B2 | 9/2014 | Bobak | |
| 9,400,718 B2 | 7/2016 | Babashetty | |
| 9,875,373 B2 | 1/2018 | Glading | |
| 2001/0042227 A1* | 11/2001 | Stephenson | G06F 11/3433 |
| | | | 714/E11.015 |
| 2002/0083251 A1* | 6/2002 | Chauvel | G06F 1/3203 |
| | | | 711/E12.07 |
| 2003/0135632 A1 | 7/2003 | Vrzic | |
| 2009/0282414 A1* | 11/2009 | Branda | G06F 9/5038 |
| | | | 718/103 |
| 2013/0316718 A1* | 11/2013 | Hsu | H04W 72/1278 |
| | | | 455/450 |
| 2014/0068624 A1* | 3/2014 | Fuller | G06F 9/5022 |
| | | | 718/104 |
| 2014/0068700 A1* | 3/2014 | Reilly | G06F 9/468 |
| | | | 726/4 |
| 2014/0282503 A1* | 9/2014 | Gmach | H04L 41/0823 |
| | | | 718/1 |
| 2018/0352515 A1 | 12/2018 | Luna | |
| 2019/0391980 A1* | 12/2019 | Mundar | G06F 16/217 |
| 2020/0220933 A1 | 7/2020 | Kwatra | |
| 2020/0412624 A1 | 12/2020 | Brown | |
| 2022/0007253 A1* | 1/2022 | Albero | H04L 41/149 |

OTHER PUBLICATIONS

"IBM Cloud Pak for Watson AIOps", Downloaded Apr. 14, 2021, 12 pages, <https://www.ibm.com/cloud/cloud-pak-for-watson-aiops>.

"Ingress Gateway", Downloaded Apr. 14, 2021, 8 pages, <https://istio.io/latest/docs/tasks/security/authorization/authz-ingress/>.

"Istio on IBM Cloud", Downloaded Apr. 14, 2021, 8 pages, <https://www.ibm.com/cloud/istio>.

* cited by examiner

| PARAMETER AND WEIGHT | USER | SUBSCORE | USER | SUBSCORE |
|---|---|---|---|---|
| | CEO | | ENGINEER | |
| ROLE | 1 | 1 | .8 | .8 |
| ROLE WEIGHT | 1 | | 1 | |
| FREQUENCY | .5 | .4 | 1 | .8 |
| FREQUENCY WEIGHT | .8 | | .8 | |
| WHEN ACCESSED | .5 | .25 | 1 | .5 |
| 'WHEN' WEIGHT | .5 | | .5 | |
| WHAT IS ACCESSED | .5 | .3 | 1 | .6 |
| 'WHAT' WEIGHT | .6 | | .6 | |
| IP ADDRESS | .5 | .15 | .5 | .15 |
| 'IP' WEIGHT | .3 | | .3 | |
| NEED | .8 | .48 | .6 | .36 |
| 'NEED' WEIGHT | .6 | | .6 | |
| TOTAL SCORE | | 2.58 | | 3.21 |

FIG. 2B

RESOURCE ACCESS BASED ON USER ACCESS RATINGS DURING CONSTRAINED SYSTEM PERFORMANCE

BACKGROUND

The present invention relates generally to the field of accessing computing resources, and more particularly to controlling access to a computing resource following a performance disruption.

Use of information technology (IT) and its associated computing resources occurs a countless number of times every day of the year. From a mother sending her son an e-mail, to a couple searching for a new home, to a business executive accessing critical sales data, to an immunologist researching health information—access to computing resources is important to everyone. Accessing the Internet via a computing device (e.g., a smartphone, a tablet, a laptop, or a desktop computer) is likely the most performed action across the globe involving multiple computing resources. Reliable access to any number of computing resources is good business for the company that provides the resources.

SUMMARY OF THE INVENTION

Embodiments of the present invention include an approach for controlling access to a computing resource following a performance disruption. In one embodiment, an overall access rating for each user in a plurality of users for accessing a computing resource of a set of computing resources is generated. Reduced performance of the computing resource is identified. Access metrics associated with each user in the plurality of users who are accessing the computing resource during the reduced performance of the computing resource are determined. The generated overall access ratings based on the determined access metrics are modified. Access to the computing resource is granted based on a ranking of the modified overall access ratings.

BRIEF DESCRIPTION OF THE DRAWINGS

FIG. 2B is an exemplary table depicting example access scores for two users in a company or an organization, in accordance with an embodiment of the present invention.

DETAILED DESCRIPTION

Figure 1:
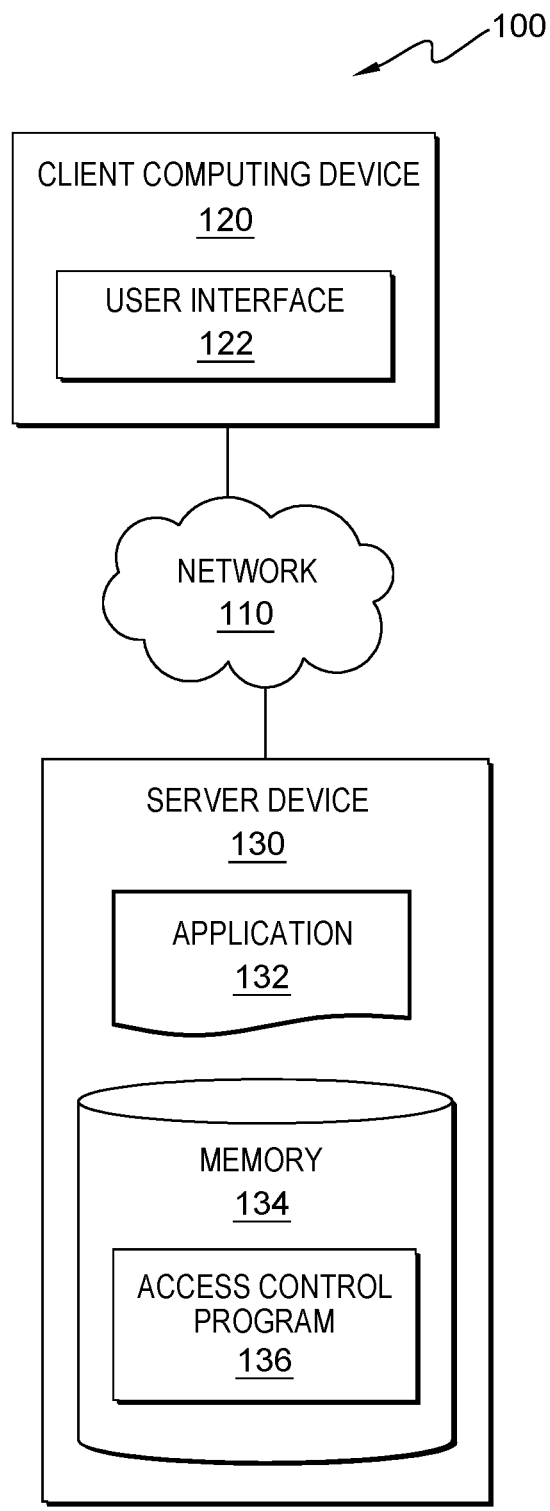
FIG. 1 depicts a functional block diagram illustrating a computing environment which includes an access control program, in accordance with an embodiment of the present invention.

Embodiments of the present invention recognize that access to various computing resources (e.g., a database that stores company data, an Internet application for accessing one's bank, a website of a physician's office to submit a health status) occurs many times every day. Losing access to computing resources, or having a computing resource incur a performance disruption, may range from irritating (e.g., not being able to access the local weather on a smartphone) to critically important (e.g., not being able to retrieve an address associated with a 911 call). When a widely used computing resource is offline or not operating at full capability, users may not be able to immediately access said computing resource when it is back online or operating normally. A technology is needed to control access to a computing resource after the computing resource suffers a performance impact (i.e., the computing resource is offline or is performing at less than one-hundred percent capability).

Embodiments of the present invention recognize that there may be a method, computer program product, and computer system for controlling access to a computing resource following a performance disruption such that the most critical users receive access to the computing resource before less important users. The method, computer program product, and computer system improves the technology of computer resource access by prioritizing the access of users to the computing resource based on various metadata associated with each of the users thus maximizing productivity. Further, this improves access to the computing resource by allowing for a 'soft' start of said resource (i.e., the number of users is controlled so that the computing resource is able to achieve full capability before the number of requests to the resource becomes overwhelming).

In an embodiment, an opt-in is received from a plurality of users. In the embodiment, metadata associated with each opted-in user is collected. Further in the embodiment, an access rating for each user is generated. Further yet in the embodiment, the generated access ratings are stored. Further yet in the embodiment, reduced performance of a computing resource is identified. Further yet in the embodiment, access metrics of each user are determined during the period of reduced performance. Further yet in the embodiment, the generated access ratings are modified. Further yet in the embodiment, users are granted access to the computing resource based on a ranking of the modified access ratings.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client computing device 120 and server device 130 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with client computing device 120 and server device 130 over network 110.

In embodiments of the present invention, client computing device 120 and server device 130 are connected to network 110, which enables client computing device 120 and server device 130 to access other computing devices and/or data not directly stored on client computing device 120 and server device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between client computing device 120 and server device 130, and any other computing devices (not shown in FIG. 1) connected to network 110, in accordance with embodiments of the present invention.

According to an embodiment, client computing device 120 is one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client computing device 120 can be a standalone computing device, a management server, a web server, a mobile computing device, or any other electronic device or computing system capable of receiving, transmitting, and processing data. In other embodiments, client computing device 120 can represent computing systems utilizing multiple computers as a server system, such as in a cloud computing environment. In certain embodiments, client computing device 120 represents a computer system utilizing clustered computers and components (e.g., database server computers, application server computers, etc.) that act as a single pool of seamless resources when accessed by elements of computing environment 100. In general, client computing device 120 is representative of any electronic device or combination of electronic devices capable of executing computer readable program instructions. According to one embodiment, client computing device 120 is a computing device for accessing any number of computing resources such as Internet application, websites, databases, and the like. In an embodiment, computing environment 100 includes any number of client computing device 120. Client computing device 120 may include internal and external hardware components as depicted and described in further detail with respect to FIG. 3, in accordance with embodiments of the present invention. In an embodiment, client computing device 120 includes user interface (UI) 122.

In an embodiment, UI 122 provides an interface between a user of client computing device 120, server device 130, and access control program 136. UI 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 122 may also be mobile application software that provides an interface between client computing device 120, server device 130, and access control program 136. Mobile application software, or an "app," is a computer program designed to run on smartphones, tablet computers and other mobile devices. UI 122 enables a user of client computing device 120 to interact with information received from server device 130, application 132, access control program 136, any other programs and applications included on server device 130 (not shown in FIG. 1), and any other computing devices (not shown in FIG. 1).

According to an embodiment, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. According to one embodiment, server device 130 is a computing device for managing user access to a computing resource. In an embodiment, computing environment 100 includes any number of server device 130. Server device 130 may include internal and external hardware components as depicted and described in further detail with respect to FIG. 3, in accordance with embodiments of the present invention. In an embodiment, server device 130 includes application 132 and memory 134.

In an embodiment, memory 134 is storage that is written to and/or read by server device 130, access control program 136, and any other programs and applications on client computing device 120 and server device 130. In one embodiment, memory 134 resides on server device 130. In other embodiments, memory 134 resides on client computing device 120, on any other device (not shown in FIG. 1) in computing environment 100, in cloud storage, or on another computing device accessible via network 110. In yet another embodiment, memory 134 represents multiple storage devices within server device 130. Memory 134 may be implemented using any volatile or non-volatile storage media for storing information, as known in the art. For example, memory 134 may be implemented with a tape library, optical library, one or more independent hard disk drives, multiple hard disk drives in a redundant array of independent disks (RAID), solid-state drives (SSD), or random-access memory (RAM). Similarly, memory 134 may be implemented with any suitable storage architecture known in the art, such as a relational database, an object-oriented database, or one or more tables. In an embodiment of the present invention, client computing device 120, server device 130, access control program 136, and any other programs and applications (not shown in FIG. 1) operating on server device 130 may store, read, modify, or write data to memory 134. In an embodiment of the present invention, data stored to memory 134 includes, but is not limited to, one or more software programs (including access control program 136), user metadata, and user access ratings.

According to an embodiment of the present invention, access control program 136 is a program, a subprogram of a larger program, an application, a plurality of applications, or mobile application software, which functions to manage access to a computing resource following a performance disruption. A program is a sequence of instructions written to perform a specific task. In an embodiment, access control program 136 runs independently. In other embodiments, access control program 136 depends on system software and/or other programs (not shown in FIG. 1) to execute. According to an embodiment, access control program 136 is a cognitive system based on artificial intelligence utilizing machine learning and deep learning which collects metadata associated with a plurality of users and ranks said plurality of users for prioritized access to a computing resource. In one embodiment, access control program 136 functions as a stand-alone program residing on server device 130. In another embodiment, access control program 136 works in conjunction with other programs, applications, etc., found in computing environment 100. In yet another embodiment, access control program 136 resides on other computing devices such as client computing device 120, which is interconnected to server device 130 via network 110.

According to an embodiment, access control program 136 receives at least one opt-in from a plurality of users. In the embodiment, access control program 136 collects metadata associated with each opted-in user. Further in the embodiment, access control program 136 generates an access rating for each opted-in user based on the collected metadata. Further yet in the embodiment, access control program 136 stores the generated access ratings. Further yet in the embodiment, access control program 136 identifies a reduced performance of a computing resource. Further yet in the embodiment, access control program 136 determines access metrics of each user during the period of reduced performance. Further yet in the embodiment, access control program 136 modifies the generated/stored access ratings based on the determined access metrics. Further yet in the embodiment, access control program 136 grants users access to the computing resource based on a ranking of the modified access ratings.

Figure 2A:
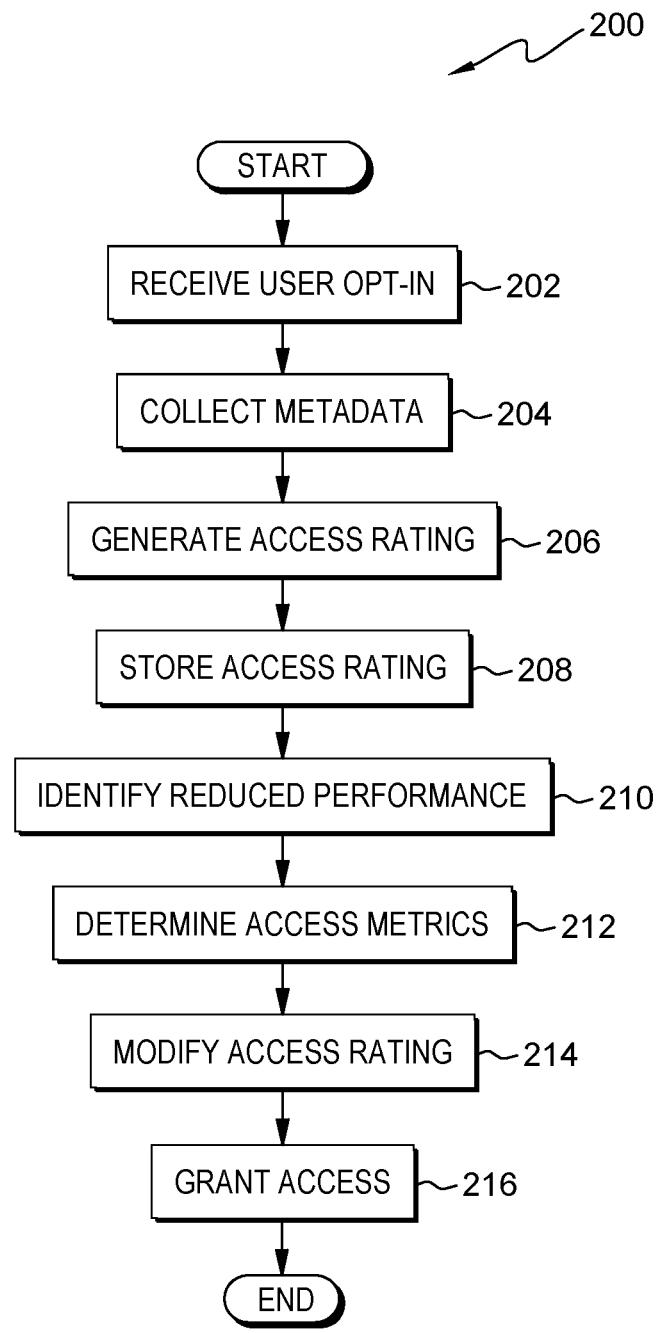
FIG. 2A is a flowchart depicting operational steps of a program for controlling access to a computing resource following a performance disruption, on a computing device within the computing environment of FIG. 1, in accordance with an embodiment of the present invention.

FIG. 2A is a flowchart of workflow 200 depicting operational steps for managing access to a computing resource following a performance disruption. In one embodiment, the method of workflow 200 is performed by access control program 136. In an alternative embodiment, the method of workflow 200 is performed by any other program in computing environment 100 working with access control program 136. In an embodiment, a user of server device 130 invokes workflow 200 upon identifying a performance disruption of a computing resource. In another embodiment, workflow 200 and access control program 136 are invoked by a user accessing client computing device 120. In yet another embodiment, workflow 200 is invoked upon the receipt of information (e.g., a status query for a web application) from client computing device 120.

In an embodiment, access control program 136 receives opt-in (step 202). In other words, access control program 136 receives an acknowledgement from one or more users to participate (i.e., opt-in) in using access control program 136. In an embodiment, access control program 136 may utilize various accessible data sources that may include personal data, content, or information the one or more users wish not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting-in to use access control program 136 enables the authorized and secure processing of personal data. Access control program 136 provides informed consent, with notice of the collection of personal data, allowing the one or more users to opt-in or opt-out of processing personal data. Consent can take several forms. Opt-in consent can impose on a user to take an affirmative action before personal data is processed. Alternatively, opt-out consent can impose on the user to take an affirmative action to prevent the processing of personal data before personal data is processed. Access control program 136 provides information to the one or more opted-in users regarding personal data and the nature (e.g., type, scope, purpose, duration, etc.) of the processing. Access control program 136 provides the one or more users with copies of stored personal data. Further, access control program 136 allows for the correction or completion of incorrect or incomplete personal data and also allows for the immediate deletion of personal data. According to an embodiment, access control program 136 on server device 130 receives an opt-in over network 110 from a plurality of users of client computing device 120. For example, an access control program on a server owned and operated by company 'B' receives opt-ins from each of the forty-five employees of the company. This one server is the only computing resource operated by 'B' and it includes applications for company e-mail, file storage, data backup, Internet access, security, finance, human resources, health and safety, and any number of other business applications.

According to an embodiment of the present invention, access control program 136 collects metadata (step 204). In other words, access control program 136 collects metadata associated with each user opted-in to use access control program 136. In an embodiment, metadata collected by access control program 136 includes, but is not limited to, each user's role in the company, how often (i.e., frequency) each user accesses various computing resources (e.g., a company server, a certain database on said server, a particular application on said server, etc.), when (i.e., time of the day and day of the week) each user accesses said resources, what (i.e., applications, databases, web browser, etc.) each user accesses, the Internet protocol (IP) address associated with each user's computing device, and the like. Access control program 136 compares the collected metadata and each type of metadata is rated relative to the same data for each user. For example, if considering 'role' a company President would have a higher rating relative to a summer intern and a department manager would have a higher rating relative to the manager's employees. In another example, 'frequency' is compared—how many times does a user access a computing resource and how long does the user spend utilizing the computing resource. In yet another example, the 'types of data' accessed by each user is considered. Natural language processing (NLP) is used to derive topics from the accessed data—a user accessing data normally accessed by that user has a higher relative ranking to an equivalent user accessing data not normally accessed by that equivalent user. The collected metadata is further weighted based on a need to access the computing resource (e.g., an employee in Human Resources attempting to access a payroll file to record another employee's wage increase is weighted higher than an employee in Legal accessing a weather report via the Internet), the duration of the performance disruption, and interactions with a support function for the computing resource. According to an embodiment, access control program 136 on server device 130 collects metadata over network 110 associated with each opted-in user of client computing device 120 as each user accesses various computing resources. For example, the access control program on the company 'B' server collects metadata associated with the forty-five employees.

In an embodiment, access control program 136 generates access ratings (step 206). In other words, access control program 136 generates an access rating for each opted-in user based on the collected metadata associated with each user. According to an embodiment, for each user access control program 136 generates a weighted score for each individual parameter included in the collected metadata by first assigning a score for each user based on the particular parameter and then multiplying said assigned score by a parameter weight. The generated scores for the metadata parameters are then summed to calculate a partial access rating for each user. The partial access rating is then adjusted based on needs considerations (e.g., access criticality for user needs, duration of the performance disruption, support interactions related to the disruption, and the like) by multiplying a 'needs' score by an associated 'needs' weight to determine a 'needs' rating; said 'needs' rating is added to the partial access rating yielding an overall total score (or overall access rating) for each user. In an embodiment, access control program 136 on server device 130 generates an access rating for each opted-in user of client computing device 120. For example, please refer to the discussion of FIG. 2B below.

FIG. 2B depicts table 250, an example showing the generation of access ratings between the company 'B' Chief Executive Officer (CEO) and an engineer working for company 'B'. The metadata parameters of table 240 are included in the 'PARAMETER AND WEIGHT' column; parameters include 'ROLE', 'FREQUENCY', 'WREN ACCESSED', 'WHAT IS ACCESSED' and 'IP ADDRESS'. For each parameter, the column also includes an associated 'WEIGHT'. Considering the parameter 'ROLE', the 'USER', 'CEO' column shows an assigned score of '1' while the 'USER', 'ENGINEER' column shows an assigned score of 0.8' (the two scores indicate that it is somewhat more important for the 'CEO' to be granted access over the 'ENGINEER'). The assigned 'ROLE' scores are multiplied by the 'ROLE WEIGHT' (note that all 'WEIGHTS' are equal for a given metadata parameter in this example but could be different in another example) resulting in a value of '1' for the SUBSCORE', 'CEO' column and a value of 0.8' in the SUBSCORE', 'ENGINEER' column. In the same manner, a SUBSCORE' is generated for the remaining metadata parameters yielding the following 'SUBSCORE', 'CEO' column values—'0.4', 0.25', 0.3', and '15' as well as the following 'SUBSCORE', 'ENGINEER' column values— 0.8', 0.5', 0.6', '0.15', and '0.36'. A 'NEED' score (located in the 'PARAMETER AND WEIGHT' column) is assigned for each of 'USER', 'CEO' and 'USER', 'ENGINEER'. Said 'NEED' scores are multiplied by the 'NEED WEIGHT' resulting in a score of 0.48' for 'USER', 'CEO' (as shown in the SUBSCORE', 'CEO' column) and a score of '0.36' for 'USER', 'ENGINEER' (as shown in the 'SUBSCORE', 'ENGINEER' column). For each of the 'USER', 'CEO' and 'USER', 'ENGINEER', the individual subscores are totaled yielding the total scores (i.e., the overall access ratings) of '2.58' (as shown at the bottom of the 'CEO' column) and '3.21' (as shown at the bottom of the 'ENGINEER' column). Thus, based on the higher access rating for the 'ENGINEER', access priority is given to the 'ENGINEER' when the computing resource is available for full or partial use.

According to an embodiment, access control program 136 stores access ratings (step 208). In other words, access control program 136 stores the generated access ratings to an available memory. In an embodiment, access control program 136 stores the generated access ratings to a memory on server device 130, a memory on client computing device 120 or a memory accessible via network 110. In addition to storing the generated access ratings, access control program 136 also stores the collected metadata associated with each opted-in user as well as the respective "weights" used to generate the stored access ratings. According to an embodiment, access control program 136 on server device 130 stores the generated access ratings (and the associated metadata) to memory 134 on server device 130. For example, the generated access ratings and associated metadata for the forty-five employees of company 'B' (including the 'CEO' and the 'ENGINEER') are stored by the access control program on the server to a database on the company 'B' server.

In an embodiment, access control program 136 identifies reduced performance (step 210). In other words, access control program 136 identifies that a normally operating computing resource is experiencing a performance disruption. According to an embodiment, the performance disruption identified by access control program 136 includes, but is not limited to, a web application is unavailable due to a software update, a server is inaccessible due to an Internet outage, a database is offline due to a ransomware attack, and a computing resource's capability is reduced due to an unexpected hardware failure or a reduced performance of one of its components (e.g., memory, processor, etc.). Each of these performance disruptions affect a user's access to the respective computing resource. In an embodiment, access control program 136 on server device 130 identifies a performance disruption such as identifying that application 132 on server device 130 is offline to users of client computing device 120. For example, the program on the company 'B' server identifies that the database storing the 'B' financial information on the server is corrupted due to a damaged file and thus is inaccessible to the forty-five employees of 'B'.

According to an embodiment, access control program 136 determines access metrics (step 212). In other words, access control program 136 determines a number of user access metrics for the period of time that the performance disruption of the computing resource is on-going. In an embodiment, access metrics determined by access control program 136 include, but are not limited to, (i) user IP addresses attempting to access the computing resource, (ii) day and time the performance disruption is resolved, (iii) the number of attempted accesses to the computing resource by each user, (iv) the number of active threads in a software application, and (v) a number of users attempting access through alternate means (e.g., changing a virtual private network (VPN) geographic location or changing from a thick client to a mobile application). According to an embodiment, access control program 136 on server device 130 determines one or more access metrics related to the performance disruption affecting application 132 on server device 130 for the users of client computing device 120. For example, the program on the company 'B' server determines access metrics for the forty-five employees.

In an embodiment, access control program 136 modifies access ratings (step 214). In other words, access control program 136 modifies the generated/stored overall access rating for each user based on the determined access metrics associated with each user. According to an embodiment, access control program 136 assigns an access metric score for each user based on said user's access metrics. Each metric is scored either '0.1' or '0.3' based on relevance or a median value. For example, for item (i) if the IP address is located where normal business hours are in effect, the user would be assigned '0.3' while an IP address located where non-business hours are in effect would be assigned '0.1'. For item (ii), if the performance disruption is resolved at a day and time of normal business hours for a group of users, that group is assigned '0.3' while remaining users are assigned '0.1'. For items (iii)-(v), a median value is calculated by access control program 136 and users at or above the median are assigned '0.3' and those below are assigned '0.1'. In an example, if the median number of access attempts to the computing resource is '10', users who have attempted access '10' or more times are assigned '0.3' and the remaining users (less than '10' access attempts) are assigned '0.1'. For each user, the assigned access metric scores are added together to determine an access metric modifier. The access metric modifier is added to the overall access rating to generate an modified access rating for each user. In an embodiment, access control program 136 on server device 130 modifies the previously generated and stored overall access ratings for each user of client computing device 120 based on said user's access metrics. For example, the access control program on the company 'B' server modifies the overall access ratings for the forty-five employees of 'B'. In the example, considering again the 'CEO' of company 'B' and the 'ENGINEER' working for 'B', the access control program on the company server modifies the previously generated respective overall access ratings. In the example, access metric scores assigned to the 'CEO' are as follows— '0.3' (IP address); '0.3' (day and time of performance resolution); '0.3' (number of access attempts); '0.1' (number of active threads); and '0.3' (changing VPN). The access metric scores for the 'ENGINEER' are 0.1' (IP address); '0.3' (day and time of performance resolution); '0.1' (number of access attempts); '0.3' (number of active threads); and '0.1' (changing VPN). Thus, the modifier for the 'CEO' is '1.3' while that of the 'ENGINEER' is '0.9' resulting in modified overall access ratings of '3.35' for the 'CEO' and '2.89' for the 'ENGINEER'. Thus, based on the modified access ratings, priority for access to the computing resource is now given to the 'CEO' rather than the 'ENGINEER'. This is due to the performance disruption affecting the financial information database, a computing resource utilized and needed more by the 'CEO' rather than the 'ENGINEER' which is reflected by the access metrics.

According to an embodiment, access control program 136 grants access (step 216). In other words, access control program 136 grants access to the computing resource that experienced the performance disruption (when said resource is available and back to normal operation) based on a ranking of the modified overall access ratings for each user. In an embodiment, access control program 136 ranks the users based on the modified overall access ratings and prioritizes access to the computing resource based on the rankings from the highest to the lowest ranking. Thus, a user with a higher ranking (i.e., a higher modified overall access rating) is given access to the computing resource before a user with a lower ranking. According to an embodiment, access control program 136 on server device 130 grants access to application 132 on server device 130 to the users of client computing device 120 based on a ranking of the modified overall access ratings associated with said users. For example, the access control program on the company 'B' server grants the forty-five employees' access to the database storing the 'B' financial information based on the modified overall access rating ranking of said employees.

In embodiment of the present invention, access control program 136 can be used by any IT architecture known in the art such as monolithic architectures and containerized architectures. For example, access control program 136 is able to restart specific containers in a prioritized order (e.g., container 'A1' will be spun up prior to container 'A2' to maximize the number of users regaining access to the computing resource). Further, if a first container hosting an application 'X' experiences a performance disruption, access control program 136 can spin up a second container to run application 'X'.

Figure 3:
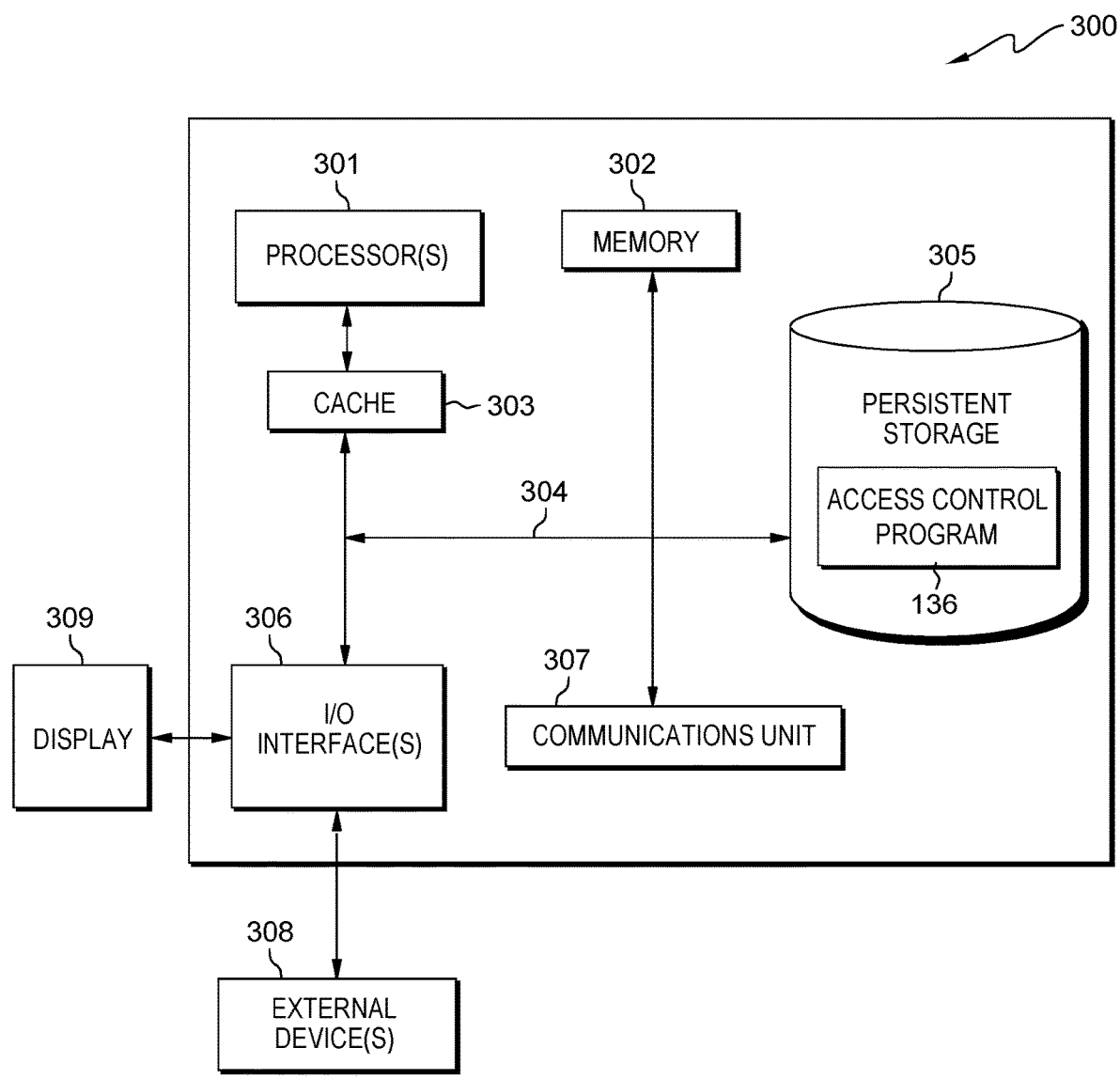
FIG. 3 depicts a block diagram of components of a computing device executing an access control program within the computing environment of FIG. 1, in accordance with an embodiment of the present invention.

FIG. 3 depicts computer system 300, which is an example of a system that includes access control program 136. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
generating, by one or more computer processors, an overall access rating for each user in a plurality of users for accessing a computing resource of a set of computing resources;
identifying, by one or more computer processors, reduced performance of the computing resource;
determining, by one or more computer processors, access metrics associated with each user in the plurality of users who are accessing the computing resource during the reduced performance of the computing resource;
modifying, by one or more computer processors, the generated overall access ratings based on the determined access metrics;
granting, by one or more computer processors, access to the computing resource based on a ranking of the modified overall access ratings;
receiving, by one or more computer processors, an opt-in from one or more users in the plurality of users; and
collecting, by one or more computer processors, metadata associated with each opted-in user in the plurality of users.

2. The method of claim 1, wherein the collected metadata associated with each opted-in user in the plurality of users includes parameters of (i) a role of each opted-in user; (ii) a frequency each opted-in user accesses the computing resource; (iii) times of a day and days of a week each opted-in user accesses the computing resource; (iv) a listing of computing resources included in the set of computing resources accessed by each opted-in user; and (v) Internet protocol (IP) addresses associated with each opted-in user.

3. The method of claim 1, wherein the step of generating, by one or more computer processors, an overall access rating for each user in a plurality of users for accessing a computing resource of a set of computing resources, comprises:
for each user in the plurality of users, assigning, by one or more computer processors, a score for each parameter in the collected metadata associated with each user;
generating, by one or more computer processors, a weighted score for each parameter by multiplying the assigned score for each parameter by a parameter weight associated with each parameter;
summing, by one or more computer processors, the generated weighted score for each parameter associated with each user to calculate a partial access rating for each user;
generating, by one or more computer processors, a needs score for each user based on an access criticality for user needs for each user, a duration of the reduced performance, and a number of support interactions related to the reduced performance;
multiplying, by one or more computer processors, each generated needs score associated with each user by a needs weight to calculate a needs rating; and
adding, by one or more computer processors, for each user the partial access rating and the needs rating to generate the overall access rating.

4. The method of claim 1, wherein the determined access metrics include (i) an IP address associated with each user attempting to access the computing resource; (ii) a day and a time associated with resolution of the reduced performance of the computing resource; (iii) a number of attempted accesses to the computing resource by each user; (iv) a number of active threads; and (v) a number of users attempting access via alternate means.

5. The method of claim 1, wherein the step of modifying, by one or more computer processors, the generated overall access ratings based on the determined access metrics, comprises:
assigning, by one or more computer processors, an access metric score for each access metric associated with each user based on relevance;
summing, by one or more computer processors, each user's assigned access metric scores to determine an access metric modifier; and
modifying, by one or more computer processors, each user's overall access rating by adding the determined access metric modifier associated with each user to each user's respective overall access ratings resulting in a modified access rating for each user.

6. The method of claim 1, wherein the step of granting, by one or more computer processors, access to the computing resource based on a ranking of the modified overall access ratings, comprises:
determining, by one or more computer processors, that the computing resource is operating normally;
generating, by one or more computer processors, a ranking of users based on the modified overall access rating associated with each user, wherein a highest modified access rating has a highest ranking; and
granting, by one or more computer processors, access to the computing resource based on the generated ranking.

7. A computer program product, the computer program product comprising:
one or more computer readable storage media; and
program instructions stored on the one or more computer readable storage media, the program instructions comprising:
program instructions to generate an overall access rating for each user in a plurality of users for accessing a computing resource of a set of computing resources;
program instructions to identify reduced performance of the computing resource;
program instructions to determine access metrics associated with each user in the plurality of users who are accessing the computing resource during the reduced performance of the computing resource;

program instructions to modify the generated overall access ratings based on the determined access metrics;
program instructions to grant access to the computing resource based on a ranking of the modified overall access ratings;
program instructions to receive an opt-in from one or more users in the plurality of users; and
program instructions to collect metadata associated with each opted-in user in the plurality of users.

8. The computer program product of claim 7, wherein the collected metadata associated with each opted-in user in the plurality of users includes parameters of (i) a role of each opted-in user; (ii) a frequency each opted-in user accesses the computing resource; (iii) times of a day and days of a week each opted-in user accesses the computing resource; (iv) a listing of computing resources included in the set of computing resources accessed by each opted-in user; and (v) Internet protocol (IP) addresses associated with each opted-in user.

9. The computer program product of claim 7, wherein the program instructions to generate an overall access rating for each user in a plurality of users for accessing a computing resource of a set of computing resources, comprises:
for each user in the plurality of users, program instructions to assign a score for each parameter in the collected metadata associated with each user;
program instructions to generate a weighted score for each parameter by multiplying the assigned score for each parameter by a parameter weight associated with each parameter;
program instructions to sum the generated weighted score for each parameter associated with each user to calculate a partial access rating for each user;
program instructions to generate a needs score for each user based on an access criticality for user needs for each user, a duration of the reduced performance, and a number of support interactions related to the reduced performance;
program instructions to multiply each generated needs score associated with each user by a needs weight to calculate a needs rating; and
program instructions to add for each user the partial access rating and the needs rating to generate the overall access rating.

10. The computer program product of claim 7, wherein the determined access metrics include (i) an IP address associated with each user attempting to access the computing resource; (ii) a day and a time associated with resolution of the reduced performance of the computing resource; (iii) a number of attempted accesses to the computing resource by each user; (iv) a number of active threads; and (v) a number of users attempting access via alternate means.

11. The computer program product of claim 7, wherein the program instructions to modify the generated overall access ratings based on the determined access metrics, comprises:
program instructions to assign an access metric score for each access metric associated with each user based on relevance;
program instructions to sum each user's assigned access metric scores to determine an access metric modifier; and
program instructions to modify each user's overall access rating by adding the determined access metric modifier associated with each user to each user's respective overall access ratings resulting in a modified access rating for each user.

12. The computer program product of claim 7, wherein the program instructions to grant access to the computing resource based on a ranking of the modified overall access ratings, comprises:
program instructions to determine that the computing resource is operating normally;
program instructions to generate a ranking of users based on the modified overall access rating associated with each user, wherein a highest modified access rating has a highest ranking; and
program instructions to grant access to the computing resource based on the generated ranking.

13. A computer system, the computer system comprising:
one or more computer processors;
one or more computer readable storage media; and
program instructions stored on the one or more computer readable storage media for execution by at least one of the one or more computer processors, the program instructions comprising:
program instructions to generate an overall access rating for each user in a plurality of users for accessing a computing resource of a set of computing resources;
program instructions to identify reduced performance of the computing resource;
program instructions to determine access metrics associated with each user in the plurality of users who are accessing the computing resource during the reduced performance of the computing resource;
program instructions to modify the generated overall access ratings based on the determined access metrics;
program instructions to grant access to the computing resource based on a ranking of the modified overall access ratings;
program instructions to receive an opt-in from one or more users in the plurality of users; and
program instructions to collect metadata associated with each opted-in user in the plurality of users.

14. The computer system of claim 13, wherein the collected metadata associated with each opted-in user in the plurality of users includes parameters of (i) a role of each opted-in user; (ii) a frequency each opted-in user accesses the computing resource; (iii) times of a day and days of a week each opted-in user accesses the computing resource; (iv) a listing of computing resources included in the set of computing resources accessed by each opted-in user; and (v) Internet protocol (IP) addresses associated with each opted-in user.

15. The computer system of claim 13, wherein the program instructions to generate an overall access rating for each user in a plurality of users for accessing a computing resource of a set of computing resources, comprises:
for each user in the plurality of users, program instructions to assign a score for each parameter in the collected metadata associated with each user;
program instructions to generate a weighted score for each parameter by multiplying the assigned score for each parameter by a parameter weight associated with each parameter;
program instructions to sum the generated weighted score for each parameter associated with each user to calculate a partial access rating for each user;
program instructions to generate a needs score for each user based on an access criticality for user needs for each user, a duration of the reduced performance, and a number of support interactions related to the reduced performance;

program instructions to multiply each generated needs score associated with each user by a needs weight to calculate a needs rating; and program instructions to add for each user the partial access rating and the needs rating to generate the overall access rating.

16. The computer system of claim 13, wherein the determined access metrics include (i) an IP address associated with each user attempting to access the computing resource; (ii) a day and a time associated with resolution of the reduced performance of the computing resource; (iii) a number of attempted accesses to the computing resource by each user; (iv) a number of active threads; and (v) a number of users attempting access via alternate means.

17. The computer system of claim 13, wherein the program instructions to modify the generated overall access ratings based on the determined access metrics, comprises:

program instructions to assign an access metric score for each access metric associated with each user based on relevance;

program instructions to sum each user's assigned access metric scores to determine an access metric modifier; and program instructions to modify each user's overall access rating by adding the determined access metric modifier associated with each user to each user's respective overall access ratings resulting in a modified access rating for each user.

* * * * *